(No Model.)
J. P. HOLT.
Barrel Filler.
No. 233,247.  Patented Oct. 12, 1880.
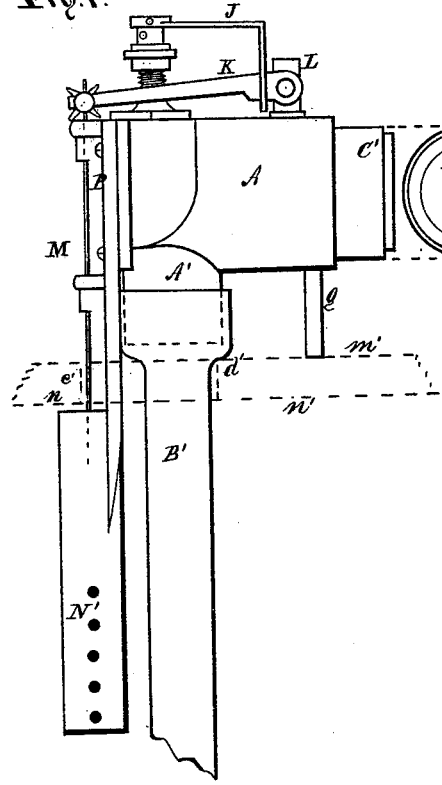
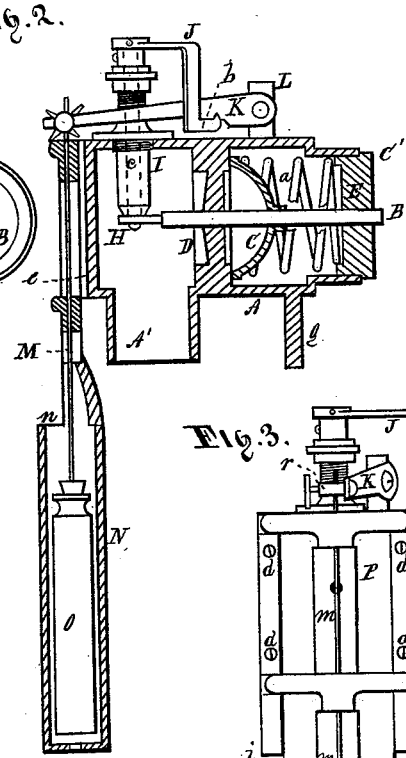
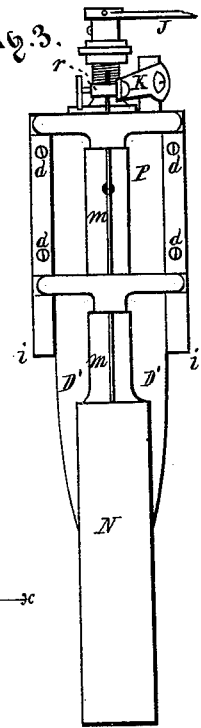
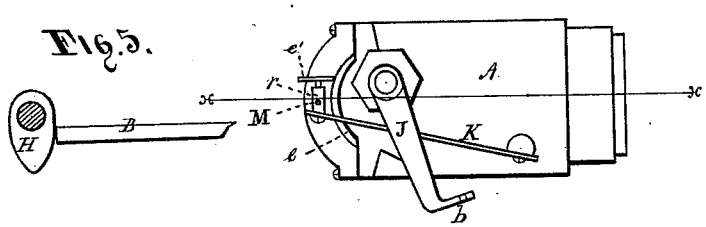
Witnesses
Edward Kells
W R Sabin
Inventor
John P Holt
Wm H Burridge
Atty

UNITED STATES PATENT OFFICE.

JOHN P. HOLT, OF CLEVELAND, OHIO.

BARREL-FILLER.

SPECIFICATION forming part of Letters Patent No. 233,247, dated October 12, 1880.

Application filed June 7, 1880. (No model.)

*To all whom it may concern:*

Be it known that I, JOHN P. HOLT, of Cleveland, in the county of Cuyahoga and State of Ohio, have invented new and useful Improvements in Barrel-Fillers, of which the following is a description, reference being had to the annexed drawings, making a part of this specification, in which—

Figure 1 shows a side view of the barrel-filler. Fig. 2 is a vertical section through the line $x\ x$. Fig. 3 is a front view. Fig. 4 is a plan view, and Fig. 5 a detached section.

Like letters of reference refer to like parts in the views presented.

The improvements above alluded to relate to a flexible tube or hose for filling the barrel, and to the float-pipe or chamber provided with a recess to permit the said flexible hose and float-chamber to be inserted in the bung-hole of the barrel, substantially as set forth in the following more particular description.

In the drawings, A represents a chamber, within and upon which is arranged the following mechanism: B is a rod, to which is secured a button-valve, C. Said rod is supported in position by the transverse bars or centers D and E, and slides reciprocally therein for opening and closing the valve of said valve-center. D is the seat. The valve is kept closed, as seen in Fig. 2, by a spring, $a$, surrounding the rod.

H is a cam attached to the lower end of a spindle. (Indicated by the dotted lines $c$.) Said spindle passes freely up through a sleeve, I, to an arm, J, to which it is secured, and whereby the cam is operated, for a purpose presently shown. A detached view of the cam alluded to and a section of the rod B are shown in Fig. 5.

The lower end of the above-said arm terminates in a hook, $b$, that it may be attached to a trip-lever, K, as shown in Fig. 1. One end of said lever is pivoted to a standard, L.

To the opposite end of the lever is fastened a rod, M, extending therefrom down into a pipe or chamber, N, containing a float, O, to which the lower end of the rod is made fast. The said pipe N is secured to the chamber A by screw-bolts $d$, passing through a plate, P, an integral part of the pipe. Said plate does not fit closely to the end of the chamber, there being a space $e$, Figs. 2 and 4, between the plate and chamber, for a purpose hereinafter shown.

It will be observed that a portion of the diameter of the pipe N projects beyond the face of the plate P, forming a recess at $n$, and that in the face of the plate are elongated openings $m$, Fig. 3, communicating with the space $e$, above alluded to.

A' is the outlet of the chamber, to which is made fast a flexible tube or hose, B', Fig. 1.

The practical operation of the above-described barrel-filler is as follows: In the bung-hole of the barrel is inserted the pipe N and hose B'. To allow the pipe and hose to pass together through the bung-hole, the hose is pressed closely against the side of the pipe. In this condition the pipe and hose can be easily pushed down through the bung-hole to the recess $n$, Fig. 1. The projecting part of the pipe will now slip under the edge of the bung-hole and permit the compressed hose to expand to its full capacity, as shown in Fig. 1, in which the dotted lines $c'\ d'$ indicate the bung-hole of a barrel, and the lines $m'\ n'$ a section of the barrel near the hole, and upon which the chamber of the filler is supported by a leg, $g$, while being in use. Oil or other fluid is now conducted into the barrel by a hose made fast to the end C' of the chamber. To permit the oil to flow through the chamber into the barrel, the valve C is opened by turning the arm J from its position shown in Fig. 2 to that seen in Fig. 1. In this position it is retained by the hook $b$, caught on the lower edge of the trip-lever K, as seen in Fig. 1.

In turning the arm J the cam H, attached thereto as above described, impinges upon the end of the valve-rod D, and pushes it endwise, thereby opening the valve and causing a free passage-way in the chamber for the oil to flow through, thence down the flexible tube or hose to the barrel. When the barrel is full, or so much therein as to reach the float in the pipe N, said float is thereby lifted upward, causing the rod M to push upward the end of the trip-lever and disengage it from the hook $b$.

The valve, released from its confinement, is forced back upon its seat by the resiliency of the spring $a$, thereby shutting off a further flow of oil or other fluid into the barrel. While the barrel is filling the air therein escapes through the space e above described, said space being in open relation with the bung-hole when the filler is inserted therein.

The wings D' rest against the side of the bung-hole and keep the filler steadily in position while supported in the hole by the shoulders $i$ of the plate and leg $g$ alluded to.

The amount of oil to be drawn into the barrel is regulated or determined by the height of the float in the pipe, which may be adjusted therein for that purpose. The lower the float is in the pipe the sooner the oil will reach it and buoy it upward for disengaging the arm from the trip-lever in order to close the valve, and so *per contra*.

The device for adjusting the float in the pipe consists of a stay-block, $r$, Figs. 4 and 5, secured by any suitable means to the end of the trip-lever. In the said block is a hole, through which the rod M of the float passes, and is therein secured by a set-screw, $e'$, substantially as shown in the drawings.

N' are holes through which oil flows into the float-pipe for actuating the float.

What I claim as my invention, and desire to secure by Letters Patent, is—

1. The combination of chamber A, having an outlet, A', provided with a flexible discharging-tube, valve C and spring for closing said valve, cam H, arm J, and trip-lever K, and float and pipe N, provided with a recess, as and for the purpose set forth.

2. In combination with the chamber A of a barrel-filler, the face-plate P and float-pipe, secured to and in such relation to said chamber as described, and for the purpose specified.

3. The chamber A, having an outlet, A', and provided with a flexible discharging tube or hose, B', in combination with the float-pipe N, constructed as described, and arranged in relation to said discharging-hose as set forth, and for the purpose specified.

4. In combination with the trip-lever K and float, the stay-block $r$ and set-screw for adjusting said float, for the purpose specified.

5. In barrel-fillers, the float-pipe having a diametrical projection beyond the face-plate, forming a recess, $n$, above said pipe, to allow an expansion of the flexible tube or hose in combination therewith, substantially as described, and for the purpose specified.

In testimony whereof I affix my signature in presence of two witnesses.

JOHN P. HOLT.

Witnesses:
J. H. BURRIDGE,
EDWARD KELLS.